May 27, 1924.
L. A. WATTERS ET AL
1,495,976
POSTING MACHINE
Filed June 21, 1920  10 Sheets—Sheet 4
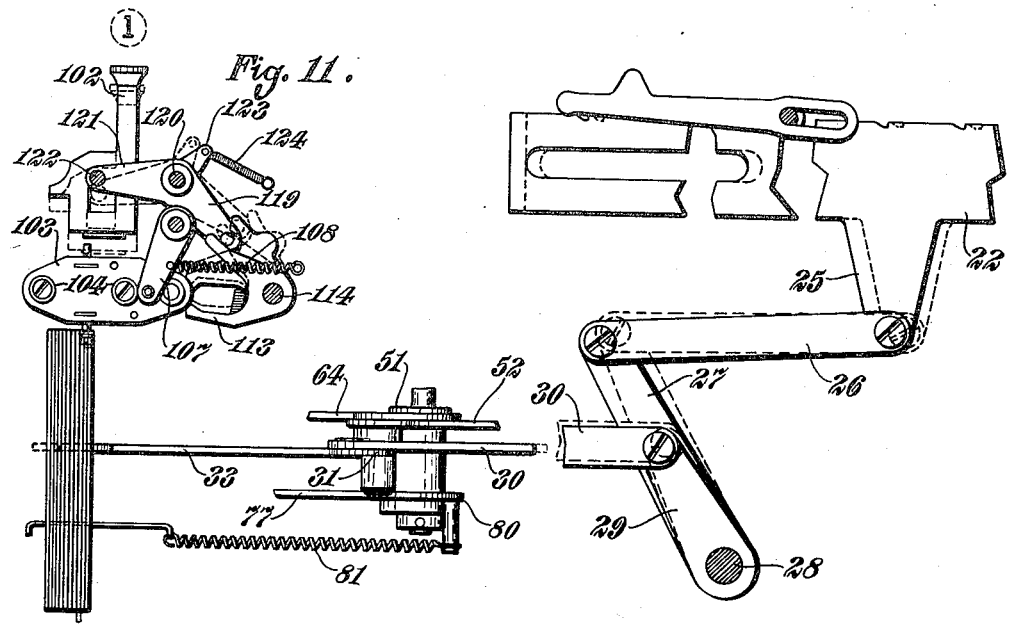
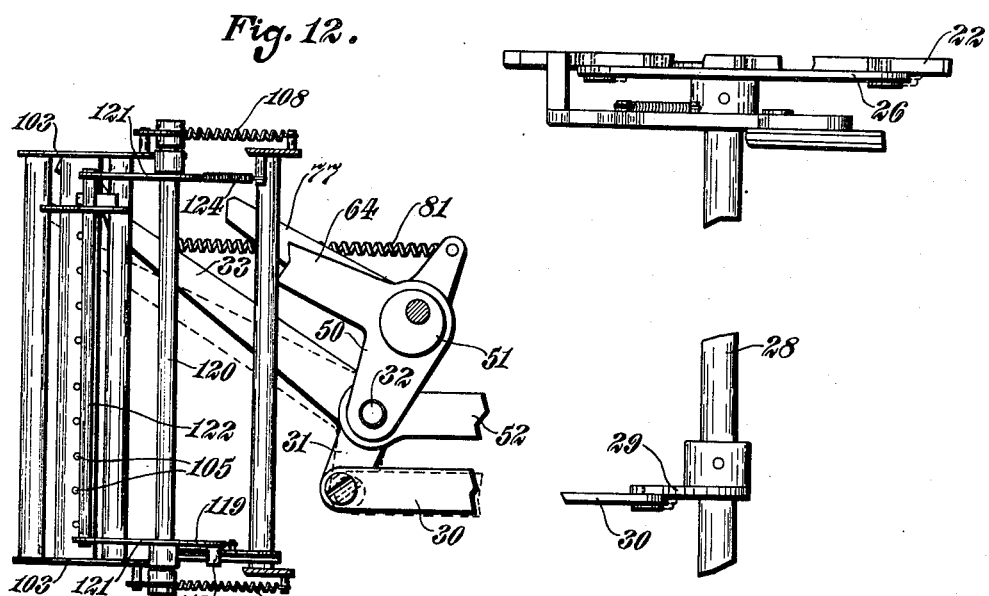
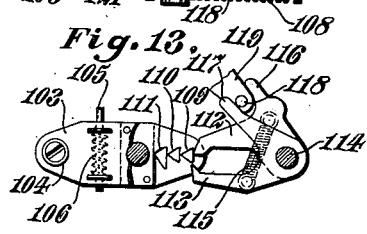
Inventors:
LUTHER A. WATTERS, & EDWIN L. RELLER,
By John W. Bruninga
Their Attorney.

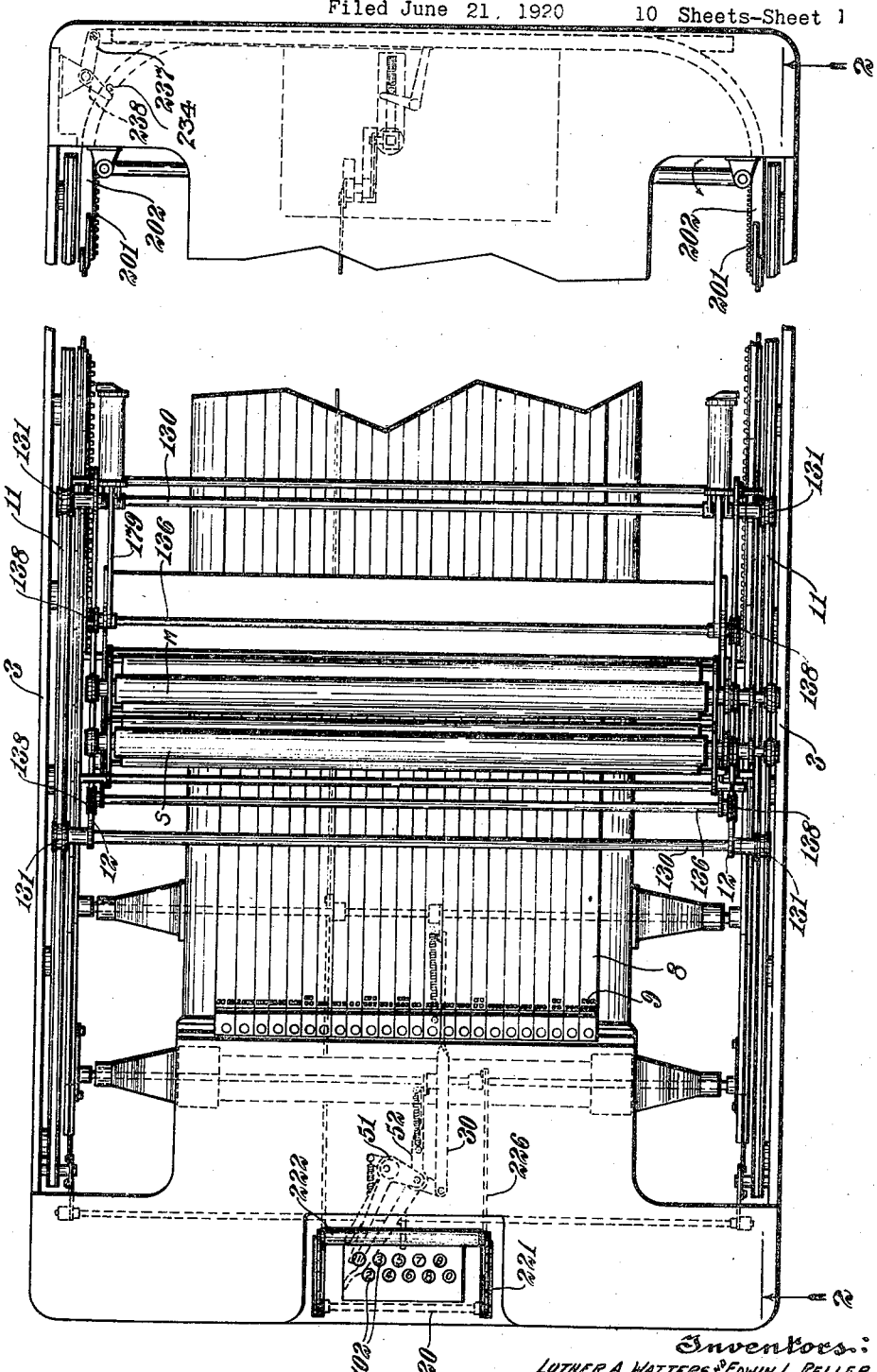

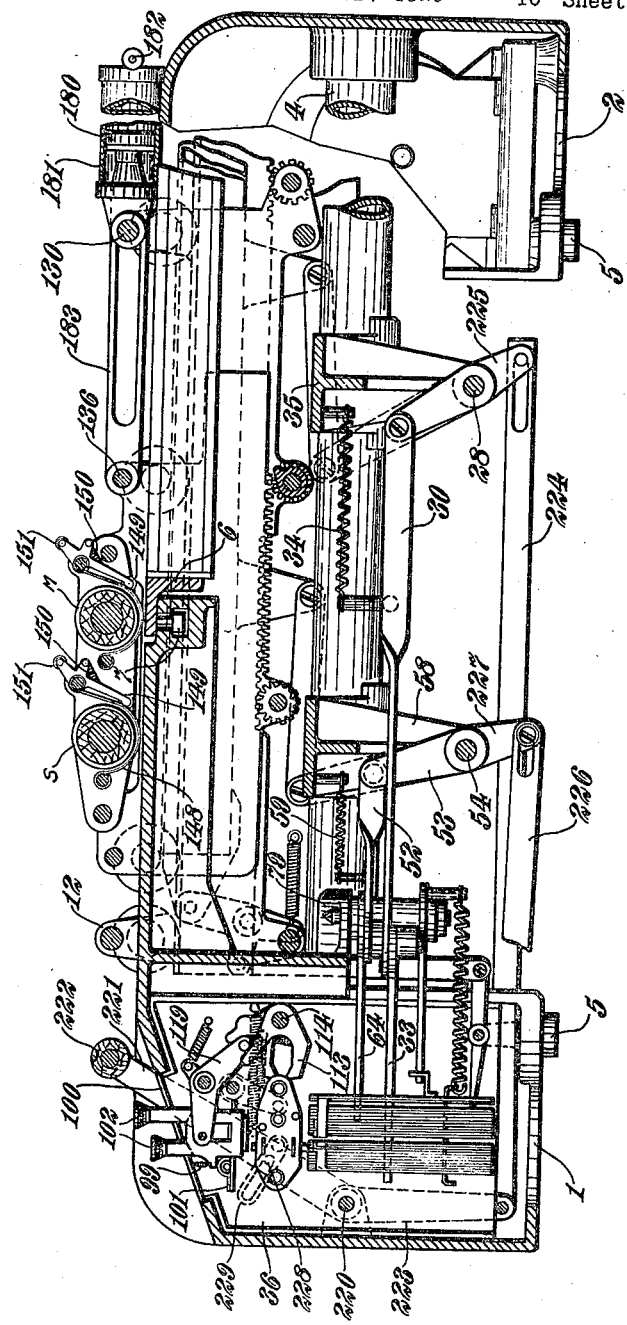

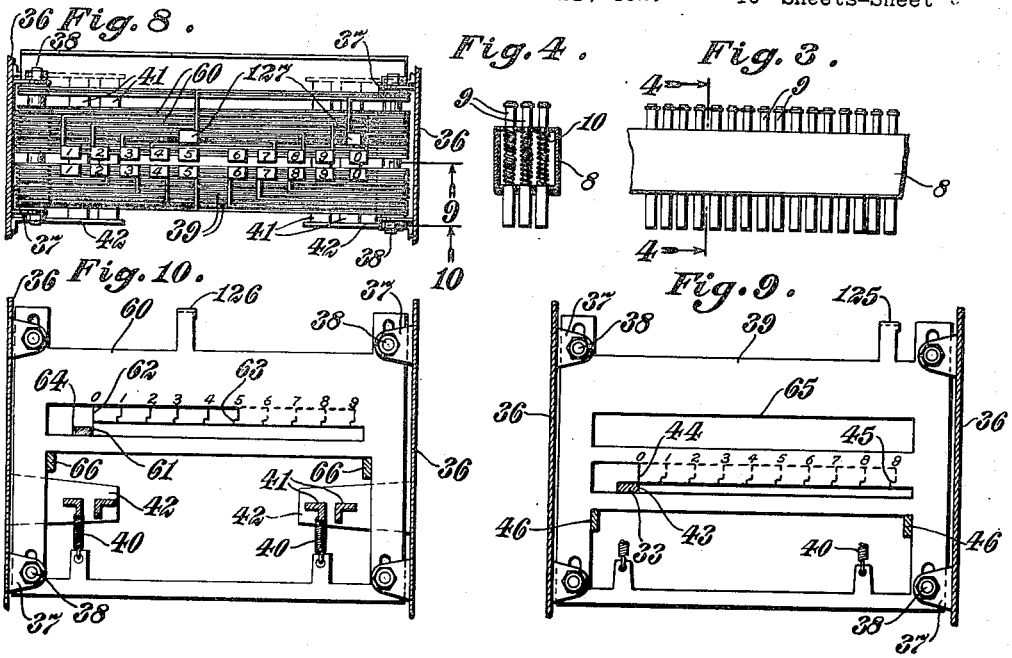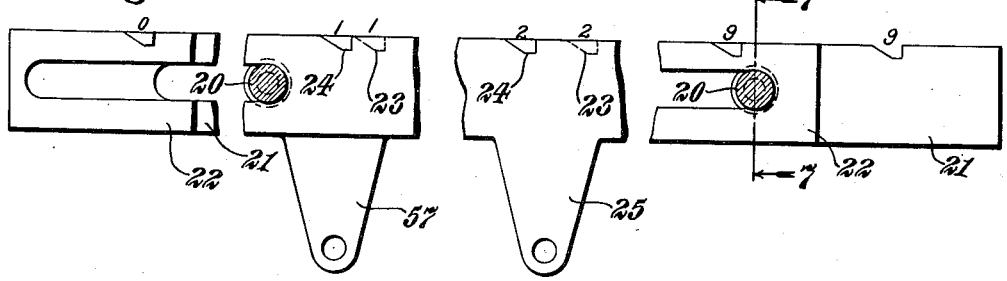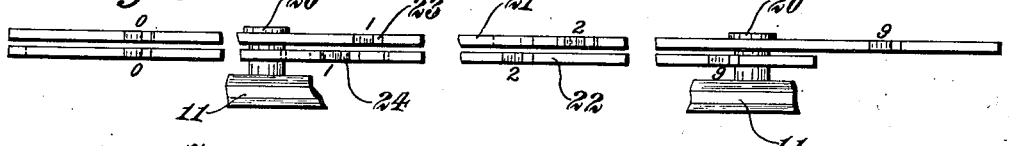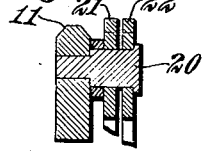

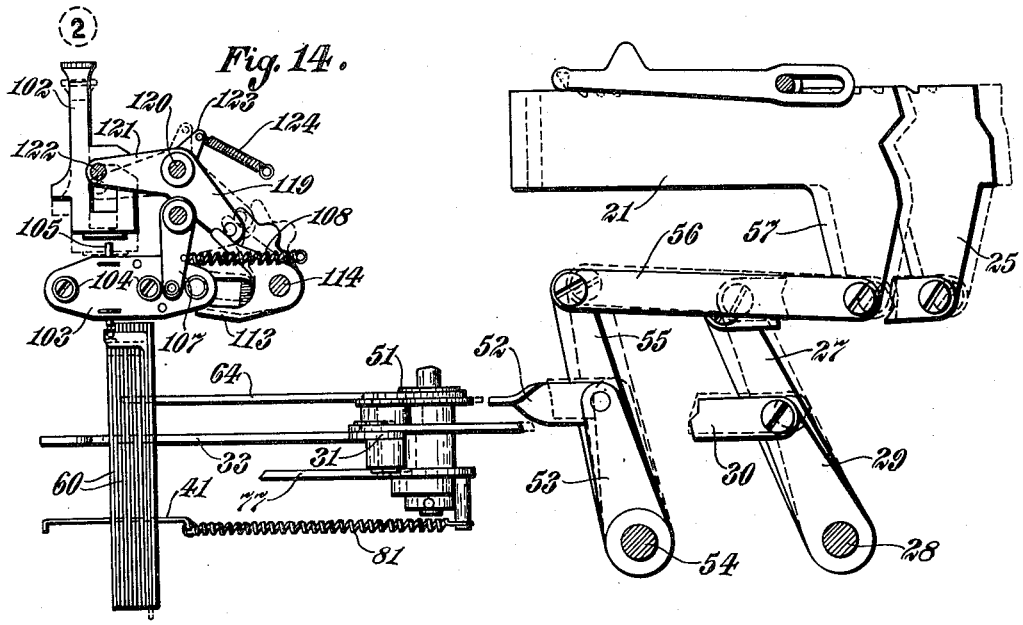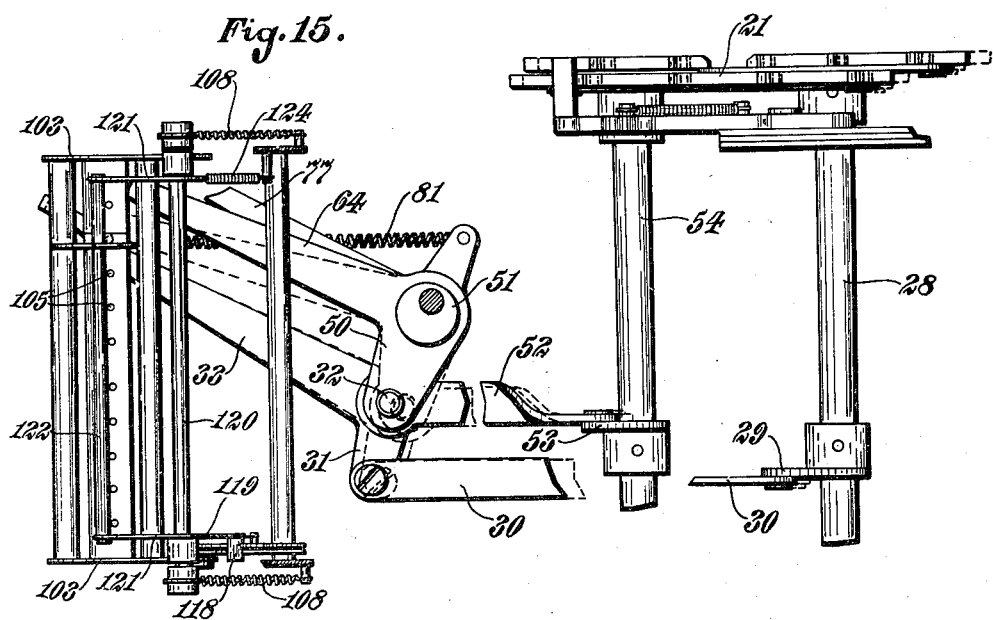

May 27, 1924.

L. A. WATTERS ET AL 1,495,976

POSTING MACHINE

Filed June 21, 1920    10 Sheets-Sheet 6

Inventors:
LUTHER A. WATTERS, and EDWIN L. RELLER,
By John H. Bruninga
Their Attorney.

May 27, 1924.
L. A. WATTERS ET AL
POSTING MACHINE
Filed June 21, 1920    10 Sheets-Sheet 7
1,495,976
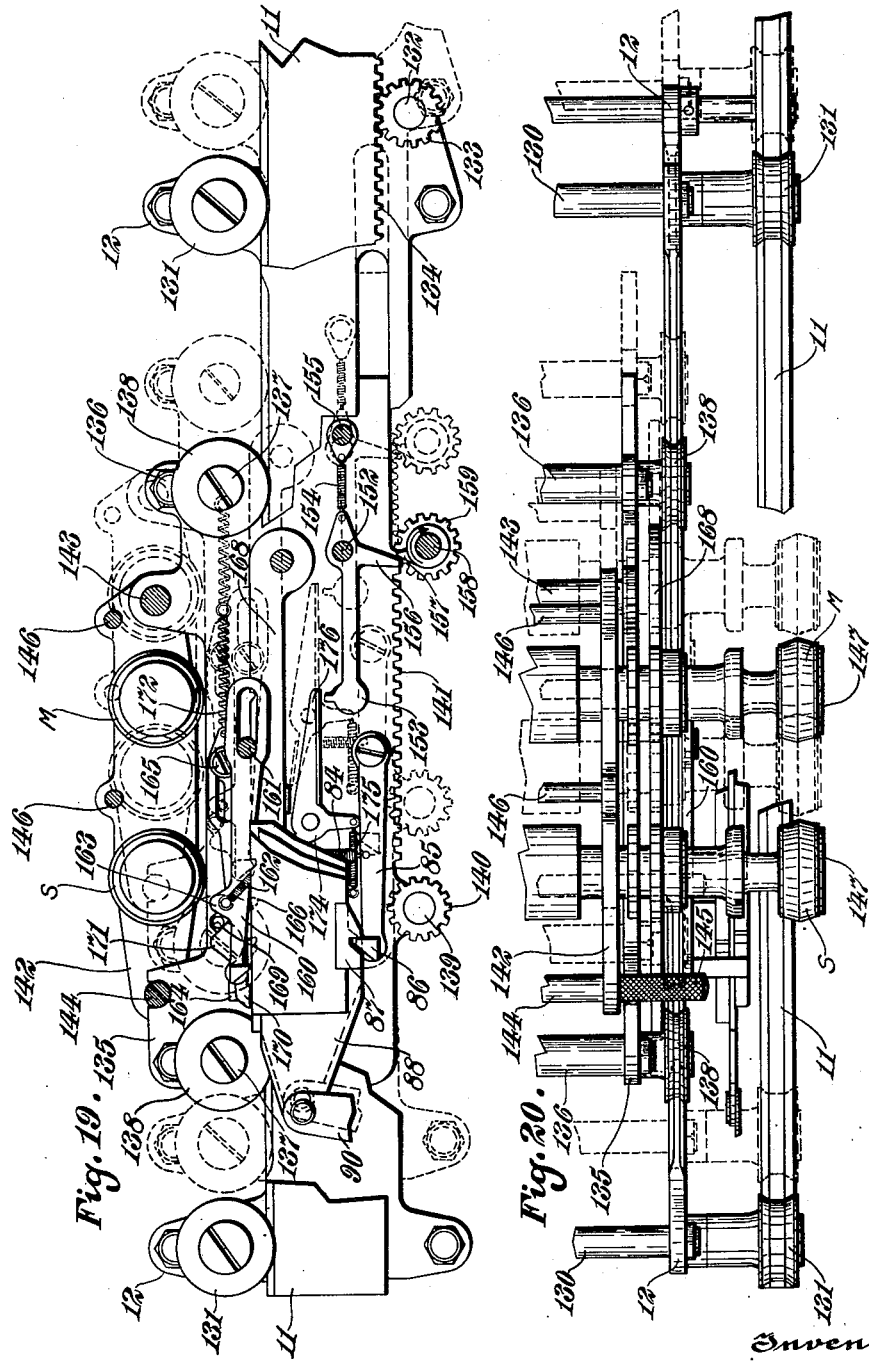
Inventors:
LUTHER A. WATTERS & EDWIN L. RELLER,
By John W. Bruninga,
Their Attorney.

May 27, 1924.
L. A. WATTERS ET AL
1,495,976
POSTING MACHINE
Filed June 21, 1920 10 Sheets-Sheet 8
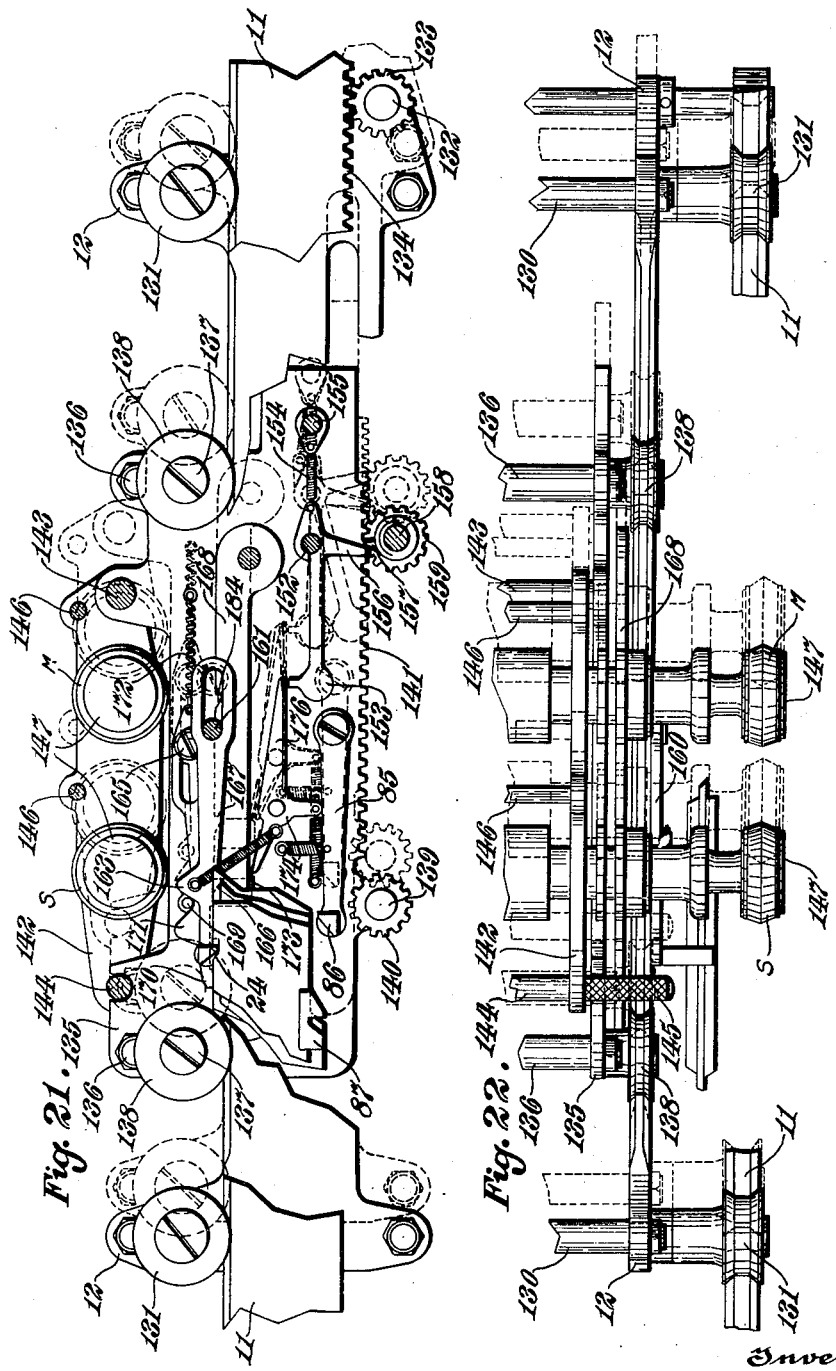
Inventors:
LUTHER A. WATTERS, and EDWIN L. RELLER,
By John H. Bruninga
Their Attorney.

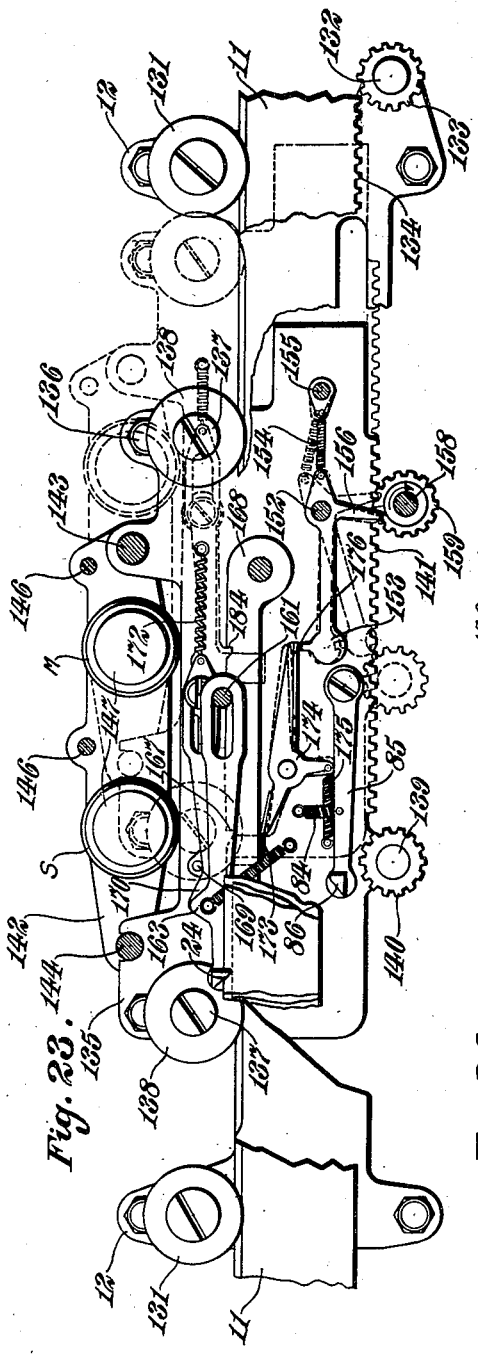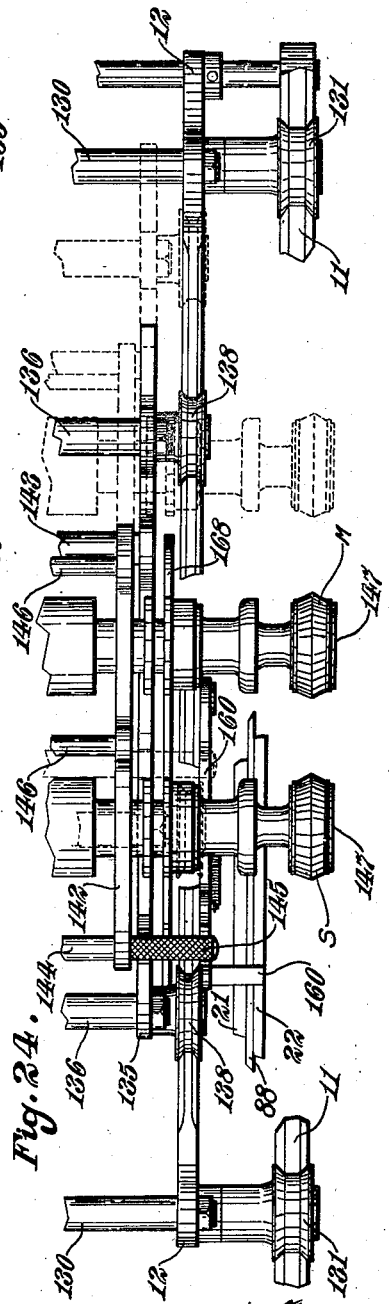

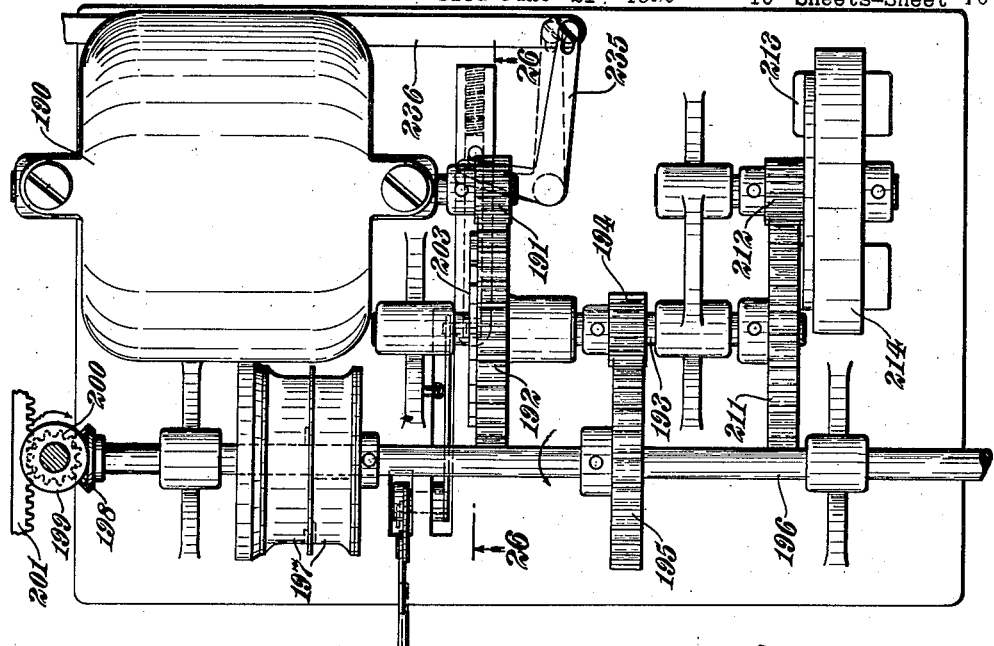
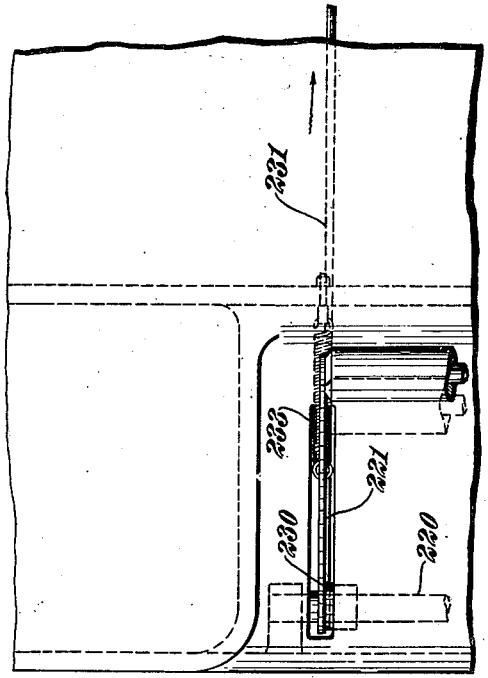
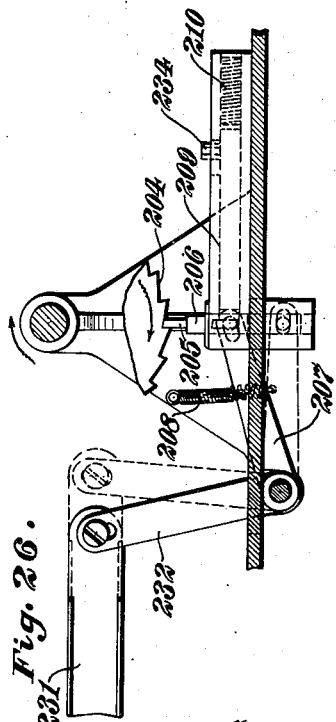

Patented May 27, 1924.

1,495,976

UNITED STATES PATENT OFFICE.

LUTHER A. WATTERS AND EDWIN L. RELLER, OF ST. LOUIS, MISSOURI, ASSIGNORS TO UNITED ACCOUNTING MACHINES, INCORPORATED, A CORPORATION OF DELAWARE.

POSTING MACHINE.

Application filed June 21, 1920. Serial No. 390,431.

*To all whom it may concern:*

Be it known that we, LUTHER A. WATTERS and EDWIN L. RELLER, both citizens of the United States, and residing at St. Louis, in the State of Missouri, have invented a certain new and useful Improvement in Posting Machines, of which the following is a specification.

This invention relates to a machine for automatically posting accounts.

In the machine of the application Serial Number 390,451, filed of even date herewith, of which the machine of this application is a further development, the platen is positioned along a printing bed so as to cooperate with selected lines of type containing principal and related items, so as to print those items on a sheet. The position of the platen along the bed is controlled by a key board which is arranged by primary, secondary and tertiary operations to finally locate the platen at a position along the bed corresponding to the principal item.

One of the objects of this invention is to further develop a machine of the application referred to so as to improve and simplify its construction and operation, and render it more accurate and certain.

Another object is to provide a machine in which upon the simple depression of keys, mechanism is automatically operated to effect final location of the platen with respect to a selected position along the bed.

Another object of this invention is to provide not only for the automatic location of a main platen, but also of a supplemental platen, and to effect automatic cooperation of these platens in succession with the selected line of type.

Another object is to improve the platen structure so as to not only render it automatic in its action, but also to simplify and render its operation more accurate and certain.

Another object is to provide a machine of the character referred to, in which the type are arranged to be moved against a located platen or platens.

Another object is to improve the locating mechanism so as to simplify its construction and render its action more reliable and certain.

Another object is to improve the construction of selective manipulative mechanism so as to position the locating mechanism with the required accuracy.

Further objects will appear from the detail description taken in connection with the accompanying drawing, in which:

Figure 1 is a plan of a machine embodying this invention;

Figure 2 is a section on the line 2—2, Figure 1;

Figure 3 is a side elevation showing a type unit;

Figure 4 is a section on the line 4—4, Figure 3;

Figure 5 is a side elevation of the locating members;

Figure 6 is a plan;

Figure 7 is a section on the line 7—7, Figure 5;

Figure 8 is a plan of the locating stops;

Figure 9 is a section along the line 9, Figure 8, showing the primary locating stops;

Figure 10 is a section along the line 10, Figure 8, showing the secondary locating stops;

Figure 11 is a detail side elevation, showing the primary locating mechanism, and also the selective manipulative mechanism;

Figure 12 is a plan of Figure 11;

Figure 13 is a detail of Figure 11, showing the transmitter carrier;

Figure 14 is a side elevation, showing the secondary locating mechanism;

Figure 15 is a plan of Figure 14;

Figure 19 is a side elevation of the platen carriages, the platens thereon and the related mechanisms;

Figure 20 is a detail plan of Figure 19;

Figures 21, 22, 23 and 24 are views similar to Figures 19 and 20, showing the parts in different positions;

Figure 25 is a detail plan, showing the motor drive mechanism; and

Figure 26 is a section on the line 26—26, Figure 25.

Figure 16:
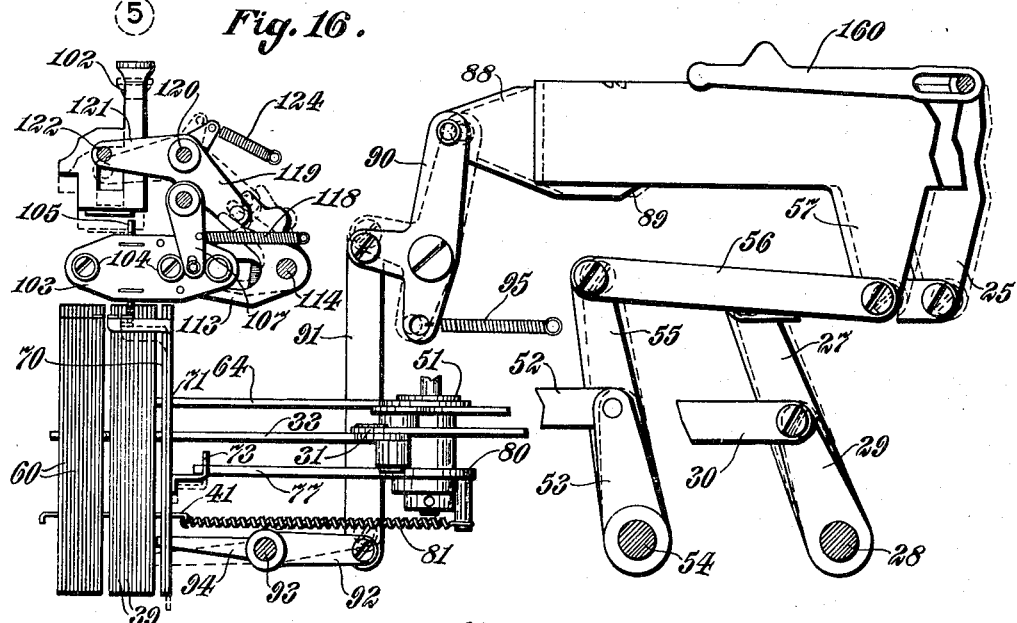
Figure 16 is a side elevation, showing the tertiary, as well as the primary and secondary, locating mechanism.

In many of the views, parts have been omitted; this has been done to promote clearness, for if all parts behind the plane at which a given view is taken were shown, it would obscure the particular mechanism under consideration.

In the drawings is shown an embodiment of this invention as exemplified in a machine for posting taxes. In such a machine, as fully described in the application referred to, the printing bed has lines of type arranged transversely thereof, each line containing as a principal item, a tax valuation, and as related items, the different taxes as well as the total corresponding to the principal item or valuation. It should, however, be understood that this embodiment is simply an example of various kinds of uses and embodiments to which this machine may be applied.

*The frame and printing bed.*

Referring to Figures 1, 2, 3, and 4, 1 and 2 designate the base, which may be made of cast iron and may comprise a pair of casing-like sections connected by sides 3 which may be integral therewith and connected also by beams 4, so as to form a braced structure. The base may have feet 5 so that the machine may rest upon a stand or table.

Mounted on the base sections 2 is a frame 6 of a printing bed which may be detachably mounted, being secured by screws 7. Arranged along this bed are a series of channels 8 which have mounted therein plungers 9, normally retained in depressed positions by springs 10 inside of the channels and carrying at their upper ends the type. There are a series of these channels arranged along and positioned in the frame of the bed so as to form columns along the bed and lines transversely thereof.

The sides 3 have mounted thereon guides 11, which have mounted thereon the side members 12 of a carriage so that this carriage is arranged to move along the machine. This carriage supports (through another carriage hereinafter to be described) a main platen M and a supplemental platen S. This carriage is moved along the machine, to the right, by a spring motor mechanism, and is arranged to be located in selected positions along the machine in a manner hereinafter to be more fully described.

*The primary locating mechanism.*

Referring to Figures 1, 2, 5, 6, 7, 8, 9, 11 and 12, mounted on each of the guides 11 are shanks 20 which support a main locating member or bar 21 and a supplemental member or bar 22, both of these bars being arranged for sliding movement on the shanks 20 and along the guide 11, it being understood that each guide has such a pair of bars mounted thereon. The bar 22, however, has considerably greater movement along the guide 11 than has the bar 21. In view of the fact that these bar sets are really identical in construction and arrangement, a description of one set will be sufficient.

The main bar 21 has arranged therealong a series of notches or locating elements 23. Where as in this particular embodiment the mechanism is adapted for the decimal system, there are ten of these locating elements corresponding to the ten primary locations and corresponding, therefore, to the principal item "0," "100," "200," etc. The supplemental bar 22 also has nine locating elements 24 arranged in spaced relation therealong. The distance between adjacent notches 24 on the supplemental bar 22 is, however, in this particular embodiment, employing the decimal system, nine-tenths of the distance between the notches 23 on the main bar 21. Accordingly, when the "0" notches are in alinement as is the case in the normal position of the parts, as hereinafter described, the "1" supplemental notches will be positioned one space behind the main latches, the "2" supplemental notches will be arranged two spaces behind the "2" main notches, etc. Accordingly, when the supplemental bar is shifted one space corresponding to one-tenth of the space between an adjacent pair of main notches, the "1" notches will be in alinement. Accordingly, any selected main notch can have alined therewith supplemental notch by shifting of the supplemental bar through the required number of spaces.

The supplemental bar 22 is provided with a lug 25 connected with a link 26 to an arm 27 fixed to a rock shaft 28, which has fixed thereto an arm 29 connected by a link 30 with the arm of a bell crank lever 31 pivoted at 32 and having another arm 33, it being noted that there are a pair of arms 27 corresponding to the pair of supplemental bars 22 and that the link 30 is connected with a spring 34 anchored on a bracket 35 connected with the tube or bar 4, so that the spring normally tends to move the supplemental bars rearwardly or to the right, Figures 2, 5 and 11, and to swing the bell crank lever 31—33 from full to dotted position, Figure 12.

The base 1 has mounted therein a subframe comprising a pair of side plates 36, provided with brackets 37 carrying cross bars 38 on which are slidingly mounted a series of primary plates 39, each connected with a spring 40 anchored on cross pieces 41 mounted in brackets 42 on the plates 36, these springs tending to maintain the plates normally in elevated positions, but permitting these plates to be depressed against the tension of their springs.

One of these plates 39, Figure 9, (which forms a latch) has a shoulder 43 arranged to take in front of the tip of the arm 33 so as to retain it normally in "0" position. The other ten plates (which form stops) have each a stop shoulder 44 arranged variantly along the assembled plates so as to locate the arm 33 in different positions and each stop 44 has a tip 45 arranged to take under the arm 33 so as to latch a depressed stop plate in depressed position.

The latch plate containing the stop 43 also has lugs 46 thereon taking underneath the other ten plates, so that upon depression of any of these other ten plates, the latch plate will be depressed. The upper face of the stop 43 terminates about even with the lower faces of the stops 44, so that in the normal position of parts, they are in substantial alinement as shown in Figure 9.

Upon depression of any selected stop plate 39, such as the "1" stop plate, the latch plate will be carried with it, thereby moving the latch shoulder 43 out of the path of the arm 33, while the stop 44 is moved into the path of the arm. The spring 34 will now move the supplemental bar 22 forwardly until the "1" notches 23 and 24 thereon are in alinement at which time the arm 33 will engage the "1" stop 44 so as to locate the parts in that position. This will place the tip 45 beneath the arm and the pressure of the spring 40 will retain the plate in that position. Accordingly, upon the depression of the "1" key, the notches 23 and 24 will be aligned at the "100" position.

*The secondary locating mechanism.*

Referring to Figures 1, 2, 8, 10, 14 and 15, the pivot 32 of the bell crank lever 31—33 is mounted on the arm 50 of a bell crank lever pivoted at 51, the pivot 32 being connected by a link 52 with an arm 53 on a rock shaft 54 mounted on a bracket 58 on the base and having at its ends, arms 55 connected by links 56 with lugs 57 on the main bars 21. A spring 59 attached to the link 52 is anchored to the bracket 58 and normally tends to move the main bar 21 and the parts attached thereto rearwardly or to the right, Figures 2 and 14.

The bars 38 have mounted thereon a series of secondary plates 60 comprising, a latch plate provided with a stop shoulder 61 and a series of ten stop plates, each provided with a stop shoulder 62. The plates 60 are similarly mounted as the plates 39, and each plate is moved upwardly by a pair of springs 40. Each stop plate is also provided at its stop 62 with a tip 63 similar to the tip 45 and performing a similar function. These latch and stop shoulders 61 and 62 are arranged to be engaged by the other arm 64 of the bell crank lever, which travels through recesses 65 in the plates 39. The latch plate is provided with a pair of lugs 66 taking underneath the stop plates, so that upon depression of any stop plate, the latch plate will also be depressed. The latch and stop plates and the stops thereon are similar in general construction to the latch stop plates 39, and further detail description thereof is, therefore, unnecessary.

When any stop plate, such as the "2" plate, is depressed, the latch shoulder 61 will be moved out of the path of the arm 64, while the "2" stop will be moved into the path of the arm. Accordingly, under the tension of the springs 34 and 49, the bars 21 and 22 are moved rearwardly carrying, through the connections heretofore described, the arm 64 with it. This causes the arm 50 to move to dotted position, and will cause the bars 21 and 22 as well as the connections to move to dotted position, Figure 15, until the arm 64 is arrested by the "2" stop and the "2" stop plate is latched in depressed position. Accordingly, both bars 21 and 22 are carried rearwardly in unison.

Now in order that the bars 21 and 22 may be carried forward equal distances upon shifting of the arm 64, it is necessary to provide the arm 33 with a curved end 67. Furthermore, it will be noted upon referring to Figures 9 and 17, that the stops 44 are really arranged on a curve closely approaching the arc of a circle having the pivot 32 as an axis. This is accomplished by placing the stops 44 successively on alternate plates from the edges of the plates to the centers and then doubling back to the other edges. Accordingly, the shifting of the center of the arm 33 will avoid material shifting relatively of the bars 21 and 22, so that when these bars are located in unison, the alined "1" shoulders will remain in alinement.

Accordingly, upon the depression of the secondary "2" stop plate, the locating members 21 and 22 will be secondarily positioned and the connections are such that upon depression, for example of a "2" stop, the alined "1" notches in the bars 21 and 22 will be shifted two-tenths of the space between two adjacent notches in the main bar 21. Accordingly, the "1" notches will be positioned at "120."

*The tertiary locating mechanism.*

Referring to Figures 1, 2, 8, 16, 17 and 18, mounted on the bars 38 are two tertiary plates 70 and 71, these plates being mounted in a manner similar to the plates 39 and 60 and being also normally retained in raised positions by the springs 40. The plate 70 is simply a tripping plate and is only provided with a tripping yoke 72. The plate 71 has in addition to a tripping yoke, attached thereto a bracket 73 provided with shoulders 74 and 75 with a connecting surface 76. These shoulders are arranged to be engaged by an arm 77 fixed to a shaft 78 mounted in a bracket 79 on the frame and having eccentrically mounted thereon the bearing 51 for the arm 50. The arm 77 has an extension 80 connected with a spring 81 attached to one of the bars 41.

Figure 17:
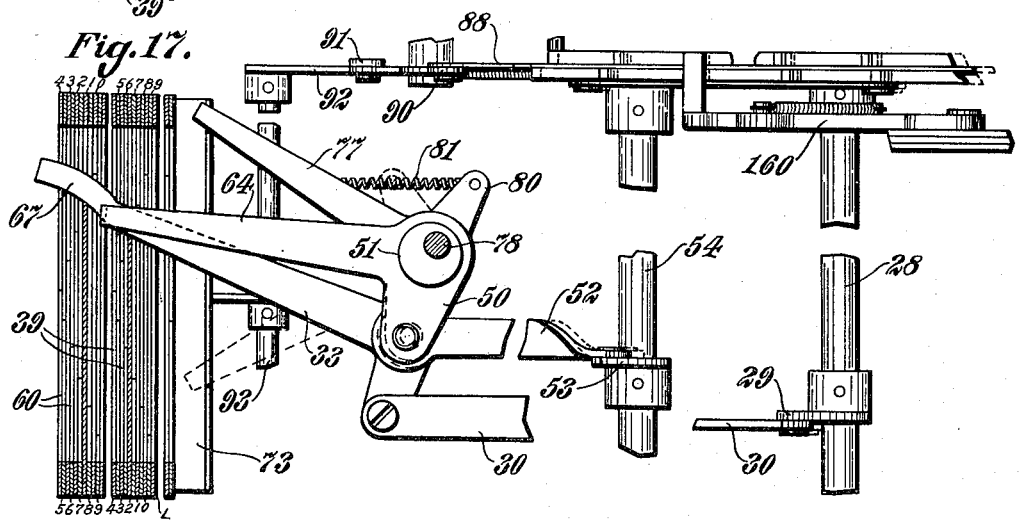
Figure 17 is a plan of Figure 16.
Figure 18:
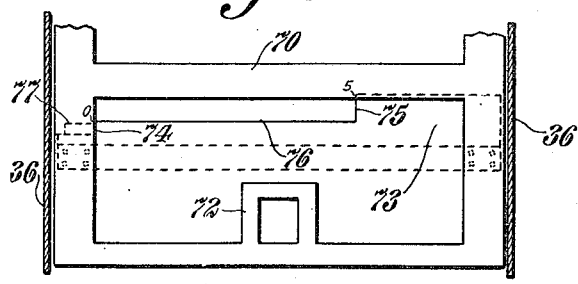
Figure 18 is a detail of the tertiary locating stops.

Assuming that the arm 77 is in the position shown in full lines, Figure 17, so as to be engaged by the shoulders 74, upon depression of the plate 70, the effect will be nil on the arm as the shoulder 74 is on the plate 71. Upon depression of the plate 71, however, the stop 74 will be moved out of the path of the arm 77 so that the latter is caused by its springs 81 to move to dotted position, Figure 17, until arrested by the shoulder 75. Now the connections are such that when this takes place, the arm 50 will be shifted carrying the arm 31 with it, so that the bars 21 and 22 are given an additional rearward movement as shown in dotted lines, Figures 16 and 17. The connections are such that upon movement of the arm 77 from full to dotted position, the bars 21 and 22 will be moved onward for one-half of a unit secondary movement so that accordingly, the bars will be shifted one-half of a secondary step.

It will also be noted that the secondary stops 63 are also arranged on a curve approaching the arc of a circle on which the arm 64 swings, and that this is accomplished by alternating the stops on the plates and doubling them back as heretofore described in connection with the stops 44.

It will, therefore, be seen that upon the depression of the plate 70, there will be no further shifting of the alined locating elements or notches in the locating members or bars 21 and 22 and this corresponding to a "0" tertiary position. Upon the shifting of the plate 71, however, the alined locating elements on the locating members or bars will be shifted through one-half of a secondary unit space and this corresponds to five units of the tertiary order or one-half of the unit of the secondary order. The locating elements are therefore positioned at "125."

The carriage release.

Referring to Figures 1, 2, 16, 17, 18, 19 and 20, the platen carriage 12 has pivoted thereon a pair of latches 85, each of which is provided with a laterally extending lug 86 arranged to take into keepers 87 fixed on the guide 11, the latches being held in engaging position by springs 84 connected with the latches and anchored on the carriage. Mounted between each pair of bars 21 and 22 and for sliding movement on the shanks 20 is a releasing bar 88, provided with a cam 89 arranged to engage the lug 86. Each bar 88 is connected with a lever 90 pivoted on the side 3 and connected by a link 91 with an arm 92 on a rock shaft 93 pivoted in the plates 36. The rock shaft 93 has an arm 94 arranged to take into the tripping yokes 72 on the plates 70 and 71. Springs 95 connecting the arms 90 and anchored on the sides 3 normally exert tensions on the connected parts tending to move them from dotted to full positions, Figure 16.

Upon depression of either plate 70 or 71, the engagement of its tripping yoke 72 with the arm 95 on which it rests will move the parts from full to dotted position, Figure 16, thereby causing the cams 89 by engagement with the lugs 86 on the latches 85 trip the same, thereby releasing the carriage and permitting it to move rearwardly along the guides 11 under the tension of the motor mechanism hereinafter to be described.

The selective manipulative mechanism.

Referring to Figures 1, 2, 8, 11, 12, 13, 14 and 16, guided in a slotted plate 100 on the base 1 and in a slotted guide 101 connecting the side plates 36 are keys 102. Each key may be provided with a spring 99 for holding it normally in raised position. There are in this case a series of ten keys numbered from "1" to "0" inclusive and corresponding to the decimal system. Accordingly, it is necessary to provide for transmitter mechanism between the key shanks and the various stop and latch plates in order to permit of primary, secondary and tertiary setting, as well as release, for the locating mechanism and the stops for controlling the same. Accordingly, mounted in the plates 36 is a transmitter carrier 103 which has rolls 104 mounted in guides in the plates 36. This carrier is provided with a series of ten plungers 105, each normally held in raised position by a spring 106. There is a plunger beneath each key shank and each shank is extended so that when the carrier is moved to different positions along the machine, these plungers will maintain their cooperative relation with the key shanks.

Arms 107 pivoted on plates 36 and connected with the carriers are connected with springs 108 anchored on the plates 36 so as to exert a tension on the carrier tending to move it to the right, Figures 11 and 13. One of the side members of the carrier has formed thereon stops 109, 110 and 111, engaged by pawls 112 and 113, pivoted at 114 on one of the side plates 36 and connected by a spring 115. The pawls 112 and 113 have arms 116 and 117 embracing a pin 118 on an arm 119 fixed to a rock shaft 120 mounted in the plates 36, and this rock shaft has fixed thereto arms 121 connected by a cross bar 122 extending across and adapted to be depressed upon depression of any key. The rock shaft 120 further has an extension 123 connected with a spring 124 anchored on one of the side plates 36.

Each of the primary plates 39 is provided with a lug 125 (Figures 8 and 9)

there being a series of ten of these lugs extending in a line across the machine, each in the path of a corresponding plunger 105 on the transmitter carrier when this carrier is in primary position shown in Figure 11 with the first stop 109 in engagement with the pawl 112.

The secondary stop plates 60 also have each a lug 126 (Figures 8 and 9), there being a series of ten of these lugs extending in a line across the machine, each lug being adapted to be engaged by its corresponding plunger 105 when the transmitter carrier is in secondary position (Figure 14) with the second stop 110 in engagement with the pawl 112.

Each of the plates 70 and 71 is provided with a lug 127, there being two of these lugs, arranged in a line across the machine and in position to be engaged by "0" and "5" plungers when the transmitter carrier is in tertiary position, Figure 16, with the third stop 111 in engagement with the pawls 112.

Let us assume that it is desired to obtain the location "125" and referring to Figures 11, 14 and 16, the procedure will be as follows:

Upon depression of the "1" key as the primary key, Figure 11, this key will through the "1" plunger 105 engaging the lug 125 on the alined "1" stop plate 39 depress the primary stop plate so as to release the arm 33 and arrest it by the "1" stop 44, thereby alining the "1" notches 23 and 24 on the main and supplemental bars 21 and 22 as heretofore described, the plates being latched in position by the tip 45 taking underneath the arm 33. Upon depression of the key, the pawls 112 and 113 will be moved to dotted position, Figure 11, thereby moving the pawl 112 out of the path of the first stop 109 and moving the pawl 113 into the path of that stop. Now in view of the fact that the pawl 113 is slightly shorter than the pawl 112, the transmitter carrier will be moved a short distance to the right, Figures 11 and 13 until arrested by the engagement of the stop 109 with the pawl 113. This movement is not, however, sufficient to shift the plunger 105 out of cooperation with the lug 125. Upon return of the depressed key, the pawls will be shifted back and upon the first movement, the pawl 112 will bear on top of the stop 109, the spring 115 yielding during such movement, but after the pawl 113 has been moved out of the path of this stop, the spring 108 will shift the carrier to the right, Figure 11, until it is arrested by engagement of the second stop 111 with the pawl 112.

Upon return of the key, therefore, the transmitter carrier has been shifted to now aline the plungers with the secondary lugs 126 (Figure 14). Upon depression of the "2" key, it will operate through the corresponding plunger 105 and the lug 126 on the "2" stop plate to depress this plate and with it the latch plate so as to release the arm 64 and stop it in the "2" secondary position, the secondary plate being latched by the tip 63 taking under the arm 64. Upon the depression and return of the key, the transmitter carrier is again shifted until it is finally arrested by the engagement of the second stop 110 with the pawl 112.

The depression and release of the "2" key as the secondary key will place the transmitter carrier with the "0" and "5" plungers 105 thereon in position to cooperate with the tertiary lugs 127 as shown in Figure 16. Upon depression of the "5" key, therefore, the tertiary plate 71 will be depressed, thereby releasing the arm 77 and causing it to be arrested by engagement with the tertiary stop 75 as shown in dotted position, Figure 17, the plate 71 being latched by the engagement of the arm 77 with the face 76. Accordingly, the alined primary locating notches 23 and 24, which have heretofore been shifted to secondary position, will be still further shifted one-half of a space so as to be positioned in final tertiary position. It will be noted that the third stop 111 is extended so that there will be no further shifting of the transmitter carrier as this is unnecessary.

Upon the depression of the final or tertiary key, therefore, the locating elements are located in proper position for the lugs 125. Now the depression of the tertiary plate 71 will by engagement of the tripping yoke 72 with the arm 94 release the latch 85 so as to permit the carriage to move rearwardly under the action of its motor spring as heretofore described, and this carriage is now located in the selected position "125" in a manner hereinafter to be described.

*The platen mechanism.*

The side members 12 of the main carriage are connected by cross bars 130 provided with rolls 131 running on the guide 11. This carriage has further mounted thereon a shaft 132 having fixed thereto pinions 133 meshing with racks 134 on the guides 11 so as to provide justifying means which maintain the platens at right angles to the bed.

A supplemental carriage comprising side members 135 connected by cross bars 136 and shafts 137, has rolls 138 running on the side members 12 of the main carriage, which side members, therefore, provide a track. A cross shaft 139 on the supplemental carriage has fixed thereto pinions 140 meshing with racks 141 on the carriage, so as to provide justifying mechanism arranged to maintain the platens at right angles to the bed during the travel of the supplemental carriage along the main carriage.

The platens M and S are mounted in a frame comprising side members 142 provided with a cross shaft 143 mounted in the supplemental carriage, so that the platen frame can be swung on the supplemental carriage, a cross bar 144 connecting the side members 142 and resting in notches in the sides 135 of the supplemental carriage providing locating means, and the cross bar being provided with a knurled handle 145, whereby the platen frame may be lifted. The platen frame is further strengthened by cross bars 146. The shafts of the platens are provided with knurled heads 147 whereby these platens may be turned, and each platen is provided with a guide 148 and with tension rolls 149, which are held against the platen by springs 150 and are provided with manipulating devices 151.

The main carriage has loosely mounted on a shaft 152 a series of strikers 153, each of which is connected by a spring 154 anchored on a cross bar 155 also mounted on the side members of the main carriage. Each striker has a lug 156 arranged for cooperation with a tappet 157 on a shaft 158, mounted in the main carriage and provided with a pinion 159 arranged to mesh with the rack 141; whereby upon shifting of the supplemental carriage on the main carriage, the shaft 158 will be rotated thereby causing the tappets 157 to engage the strikers, depressing the same and then releasing the same to permit these strikers to engage a line of plungers 9 so as to force the type against the main or supplemental platen alined therewith, as hereinafter described. It will be understood in this connection that the tips of the strikers are in the located printing line on the main carriage, which line is located by the mechanism heretofore described at selected positions along the printing bed.

A pair of pawls 160 are pivoted at 161 on the side members 12 of the main carriage and it will be noted that the end of each pawl has a slot engaging pivot 161. The tip of each pawl is arranged to engage with a pair of alined locating notches 23 and 24, and it is held down on the bars 21 and 22 by a spring 162 connected therewith and anchored on the main carriage. This pawl is also provided with a cam lug 163 for a purpose hereinafter to be described.

A pawl 164 is pivoted at 165 on each side member 135 of the supplemental carriage, and each pawl is adapted to engage with notches 166, 167 and 184 on a bar 168 on each side member 12 of the main carriage. A suitable spring is provided similar to the spring 162 for maintaining each pawl with its tip pressed down on the bar 168. Each pawl 164 is also provided with a laterally projecting pin 169 for a purpose hereinafter to be described.

Pivoted at 165 and concentric with each pawl 164 is a pawl 170 which is arranged between the pawls 160 and 164 and which has a cam lug 171. Each pawl 170 is provided at its pivotal end with a slot to permit its sliding on the pivot pin 165, and is connected with a tension spring 172 anchored on the side member 135 of the supplemental carriage. This pawl may also be provided with a light spring holding it normally down with its tip on the bar 168, and with pin 169 between the cam lugs 163 and 171. Each pawl 170 has a lug 173 thereon arranged in front of the tip of one arm of a lever 174, pivoted on the main carriage maintained in that position by a spring 175, with another arm 176 in the path of one of the strikers 153. It will, of course, be understood that the pawls are duplicated on both sides of the carriages, and that an extra pair of strikers 153 is provided for impact on the arms 176, these arms being faced with hardened plate to prevent wear.

A tension is exerted on the supplemental carriage tending to move it rearwardly or to the right, Figures 1 and 19, this being accomplished by the connection of the motor springs hereinafter to be described with the supplemental carriage which, therefore, exerts a tension on the supplemental carriage tending to move it along the main carriage, and also moving the main carriage with it on account of the pawl connections between the main and supplemental carriages as heretofore described. In order to retard the movement of the supplemental carriage, the cross bars 136 have mounted thereon piston rods 179, each provided with a piston 180 traveling in a cylinder 181 of a dash pot mounted on the cross bar 130 of the main carriage and provided with a vent 182, it being noted that there are a pair of these cylinder and piston connections, one on each side of the carriage. A pair of slotted links 183 are mounted on bars 136 on the supplemental carriage and take over the bars 130 on the main carriage, thereby limiting the forward movement to the left, Figure 2, of the supplemental carriage on the main carriage, and providing a returning connection.

*The operations in printing.*

Referring to Figures 1, 2 and 19 to 24 inclusive, when the main carriage has been released by tripping of the pawls 85, as heretofore described, the main carriage with the supplemental carriage thereon will move rearwardly or to the right until the pawls 160 drop into the alined locating notches in the main and supplemental bars 21 and 22 at the position "125" set up on the machine, as heretofore described. At this time, the supplemental carriage will be latched on the main carriage, the pawl 170 being also at this time latched by the lever 174 taking behind the lugs 173. The pawls 160, being now arrested, but the main carriage being still under the tension of the motor spring, tending to move the same to the right, will continue in its movement until arrested by the pivot 161 engaging the ends of the slots in the pawls 160. During this movement from full to dotted positions, Figures 19 and 20, the pins 169 on the pawls 164 will by engagement with the cam lugs 163 on the pawls 160 elevate the pawls 164 so as to raise them out of the notches 166, thereby causing the motor spring to move the supplemental carriage onward on the main carriage; but as the pins 169 ride over the cam lugs 163, the pawls 164 will again be dropped down by their springs or by gravity and will engage the second notches 167 when the supplemental carriage will come to rest with the main platen and the series of strikers at the printing line as shown in dotted position, Figure 21. It will be noted that while the supplemental carriage is moved by springs, it is nevertheless retarded by the dash pots 181, so that there is sufficient time for the latches 164 to drop into the notches 167 to arrest the supplemental carriage. During this movement of the supplemental carriage from full to dotted position, Figure 19, the rotation of the shaft 158 will cause the tappets 157 thereon to depress the strikers against the tension of their springs 154, and as these strikers are released, the spring will throw them against the line of type, over which the platens and under which the strikers are positioned, thereby throwing the line of type against the main platen M.

When the strikers are thrown against the type plungers, the end pair of strikers are also thrown against the levers 174. Accordingly, these levers are swung so as to move them out of engagement with the lugs 173 on the pawls 170 thereby releasing these pawls. The springs 172 will now act on these pawls to move them to the right, Figure 23, thereby causing the cam lugs 171 thereon to engage the pins 169 on the pawls 164 and lift these pawls out of the second notches 167, causing the supplemental carriage to again move to the right until it is arrested by the engagement of the pawls 164 with the third notches 184. This will arrest the supplemental carriage with the supplemental platen in the selected line of type above the strikers. This movement from full to dotted position, Figure 23, will cause further rotation of the shaft 158, thereby causing the strikers to be again oscillated so as to be impinged against the type plungers and throw the type against the supplemental platen S.

In practice, a statement sheet is placed in the main platen and a ledger sheet is placed in the supplemental platen. Accordingly, impressions are obtained successively on the statement and ledger sheets. These impressions can be obtained in any suitable manner and by any suitable inking or ribbon mechanism, or a sheet of carbon paper may be inserted with the sheet to receive the impression.

*The motor drive mechanism.*

The motor drive mechanism is fully described in the application referred to, but will again just be briefly referred to.

Referring more particularly to Figures 1, 2, 25 and 26, 190 designates any suitable electric motor, the shaft of which has a pinion 191 meshing with a gear 192 loose on a shaft 193 provided with a pinion 194 meshing with a gear 195 on a counter shaft 196, which has connected thereto spiral springs mounted in and connected with a casing 197 on the base 2. The shaft 196 has on each end a bevel gear 198 meshing with a bevel gear 199 provided with a pinion 200 meshing with a rack 201. The racks 201 slide in guides 202 which extend along and transversely of the frame and cross one another at the rear end of the frame, as shown in Figure 1. These racks are connected with the supplemental carriage and act to move this supplemental carriage rearwardly, a constant tension being exerted by the springs in casing 197.

The gear 192 forms one of a pair of clutch elements, the other clutch element being shown at 203, and being provided with ratchet teeth 204 engaged by a stop 205 having an enlarged portion 206, sliding vertically in the base and connected with one arm 207 of a bell crank lever mounted on the base, a spring 208 connected with the arm and anchored on the base tending to maintain the stop 205 in engagement with the ratchet teeth. The clutch elements form together an ordinary ball clutch which is well known in the art and a detail description thereof is, therefore, unnecessary. The stop 205 is held in depressed position by a plunger 209 engaging over the enlarged portion 206 and retained by a spring 210. The shaft 193 has a gear 211 meshing with a pinion 212 on the movable element 213 of a governor, the casing of which is shown at 214. This governor may be of any suitable construction.

Assuming that the motor is disconnected by disconnecting the clutch elements, and assuming that the motor spring has been wound up, a constant tension is exerted on the racks 201 tending to move them to the right and these springs act on the supplemental carriage to move the same to the right and carry the main carriage with it. When the clutch elements are engaged, the carriage will be returned, while the motor spring is again rewound.

The restoring mechanism.

Referring to Figures 1, 2, 25 and 26, mounted in the base section 1 is a rock shaft 220 which has mounted thereon arms 221 provided with a handle 222 moving over the casing. The rock shaft has fixed thereto an arm 223 connected by a link 224 with an arm 225 on the rock shaft 28, there being a pin and slot connection between the link 224 and the arm 225. An arm similar to the arm 223 and also mounted on the rock shaft 220 is connected with a link 226 having a pin and slot connection with an arm 227 on the rock shaft 54. The arms 221 have pins 228 working in slots on links 229 connected with the transmitter carrier 103. An arm 230 on the rock shaft 220 is connected by a link 231 with the other arm 232 of the bell crank lever, previously referred to. The handle 222 is held in normal position by one or more springs 233 connected with the arms 221 and anchored on the frame.

The plunger 209 has a pin 234 projecting through a slot in the plunger casing and in the path of one arm of a bell crank lever 235 mounted on the base and connected by a link 236 with one arm of a bell crank lever 237, also mounted on the base, and the other arm of which is in the path of a pin 238 and one of the racks 201.

In order to clear the machine and restore the parts to normal position, the auditor simply moves forward on the handle 222 and the following operations will then take place.

The links 224 and 226 will be moved forwardly and as the arms 225 and 227 will take up more or less of the lost motion, depending upon the extent of movement of the bars 21 and 22, the forward movement of the links will restore these parts to normal position. In so doing, the arms 33, 64 and 77 have also been shifted, thereby moving out of engagement with the tips 45 and 63 and the face 75 on the plates 39, 60 and 70, and permitting these plates to be moved back to normal position, while these arms are latched respectively by the shoulders 43, 61 and 74 of the latch plates 39, 60 and 70. Of course, the release of the plates 70 and 71 will release the releasing bars 88 so as to permit their springs 95 to move them back to normal position. The locating mechanism will, therefore, be restored to normal position. During the movement of the transmitter carrier, the lost motion between the pin 228 and the link 229 has been taken up but upon forward movement of the handle, the transmitter carrier is restored back to normal position and latched in that position by the engagement of the pawl 112 with the first stop 109 (Figure 13).

Upon forward movement of the handle, the stop 206 is depressed and then latched in depressed position by the plunger 209. Accordingly, the motor will be connected with the shaft 196, thereby causing it to rotate and return the carriages back to normal position. When the carriage reaches normal position, the pin 234, Figure 1, will strike against the arm of the bell crank lever 238, thereby causing it, through the connections described, to withdraw the plunger 209 and permit the spring 208 to throw the stop 205 again into the path of the teeth 204 on the clutch element 203, so as to disconnect the motor from the shaft 196 and stop further movement downward of the carriage. In practice, the carriage is moved slightly forward beyond normal position and as the spring again tends to return it, the latches 85 will snap into the keepers 87 and thus definitely latch the carriages in normal position. During this movement of the carriages, of course, the supplemental carriage is moved on the main carriage until arrested by the engagement of the end of the link 183 with the cross bar 130 when the main carriage will be moved with it. When the carriages are finally released so that the motor spring again acts on them, the pawls 164 will drop into the notches 166 so as to definitely locate the supplemental carriage as well as the main carriage in normal position.

Résumé of operations.

Referring to Figures 1, 2, 11, 14 and 14 to 26 inclusive, let us assume that it is desired to set up on the machine for the printing of the principal and related items corresponding items to the number "125." To set up the machine, the auditor will successively depress keys 1—2—5.

Upon the depression of the "1" key as the primary key, the supplemental bar 22 will be positioned with respect to the main bar so as to aline the "1" notches and, therefore, set up a primary location in the "100" position. Upon depression of the "2" key as the secondary key, the main and supplemental bars will be shifted so as to locate the alined locating notches therein in the "20" division or group of the "100" group or primary location so as to set up a secondary location at "120." Upon depression of the "5" key as the tertiary key, the main and supplemental locating bars will be shifted one-half of a space of a secondary shaft so as to set up a tertiary location at "125."

It will be noted that the tertiary location, for instance, as "125," or any number ending in "5," requires a distinct shift. For any number ending in "0," however, for instance, "120," the tertiary location is merged into the secondary location, since there is no further tertiary shifting, but the "0" locating plate 70 simply acts as a releasing plate without effecting another further tertiary location as distinguished from the previously set up secondary location.

Upon the final location, such as "125," the main carriage will be released, and it will then move to position the main platen together with the strikers at the selected location and respectively above and below the line of type corresponding to that location.

The strikers will then be actuated so as to cause the line of type to strike against the sheet on the main platen and make an impression. Thereafter the supplemental carriage is automatically moved to position the supplemental platen at the printing line or location, and the strikers are then actuated again to cause the tip at the printing line to make an impression on the supplemental platen.

The auditor will now move forward on the handle to clear the machine and this will not only shift the locating mechanism to normal position, but will also cause the motor to return the carriages so as to position the main platen in normal position or "0" position.

It will, therefore, be seen that the invention accomplishes its objects. The machine operates entirely automatically, and upon setting up on the key board a principal item, the machine thereafter operates automatically to first set up the location, then cause cooperation of the main platen with the printing line at the location, and thereafter cause cooperation of the main platen with the printing line. This automatic action not only saves time, but eliminates possible errors.

It is obvious that various changes may be made in details of construction without departing from the spirit of this invention; it is, therefore, to be understood that this invention is not to be limited to the specific details shown and described.

Having thus described the invention, what is claimed is:

1. A machine of the character described, comprising, a printing bed, a platen, means for selectively locating said platen with respect to any selected part of said bed, and means adapted upon such location to automatically effect cooperation of said platen and bed.

2. A machine of the character described, comprising, a printing bed, a platen extending across said bed, means for selectively locating said platen in any selected position along said bed, and means adapted upon such location to automatically effect cooperation of said platen and bed.

3. A machine of the character described, comprising, a printing bed having printing lines extending thereacross, a platen extending along said lines, means for selectively locating said platen in any selected position along said bed, and means adapted upon such location to automatically effect cooperation of said platen and bed.

4. A machine of the character described, comprising, a printing bed, a platen, means for locating said platen with respect to any selected part of said bed, adapted upon such location to automatically effect cooperation of said platen and bed, and selective manipulative means adapted to effect such location.

5. A machine of the character described, comprising, a printing bed, a platen, means for locating said platen with respect to any selected part of said bed, means operating automatically upon such location adapted to effect cooperation of said platen and said bed, and selective manipulative means adapted to control said locating means.

6. A machine of the character described, comprising, a printing bed, a platen, means for locating said platen in any selected position along said bed, means operating automatically upon any such selected location adapted to effect cooperation of said platen and said bed, and selective manipulative means adapted to control said locating means.

7. A machine of the character described, comprising, a printing bed, a platen, means for selectively locating said platen in any selected position along said bed, and means for moving the located part of said bed in order to cooperate with said platen.

8. A machine of the character described, comprising, a printing bed having movable type, a platen, means for selectively locating said platen with respect to any selected part of said bed, and means for causing the located type to cooperate with said platen.

9. A machine of the character described, comprising, a printing bed, main and supplemental platens, means for locating said platens with respect to said bed, and means adapted upon such location to automatically effect cooperation of said platens and said bed.

10. A machine of the character described, comprising, a printing bed, main and supplemental platens, means for locating said platens with respect to said bed, and means adapted upon such location to automatically effect cooperation of said platens successively with said bed.

11. A machine of the character described, comprising, a printing bed, main and supplemental platens, and means for locating said platens successively with respect to said bed.

12. A machine of the character described, comprising, a printing bed, main and supplemental platens, means for locating said platens successively with respect to said bed, and means adapted upon such location to automatically effect cooperation of said platens and said bed.

13. A machine of the character described, comprising, a printing bed, main and supplemental platens, means for locating said main platen with respect to said bed, and means operating automatically upon such location adapted to locate said supplemental platen with respect to said bed.

14. A machine of the character described, comprising, a printing bed, main and supplemental platens, means for locating said main platen with respect to said bed, means operating automatically upon such location adapted to locate said supplemental platen with respect to said bed, and means adapted upon such location to effect cooperation of said platens and said bed.

15. A machine of the character described, comprising, a printing bed, main and supplemental platens, means for locating said main platen with respect to said bed, means operating automatically upon such location adapted to locate said supplemental platen with respect to said bed, and means operating upon each location adapted to effect cooperation of a located platen and said bed.

16. A machine of the character described, comprising, a printing bed, main and supplemental platens, means for effecting cooperation of said main platen and said bed, and means operating automatically upon such cooperation adapted to effect cooperation of said supplemental platen and said bed.

17. A machine of the character described, comprising, a printing bed, main and supplemental platens, means for effecting cooperation of said main platen and a selected part of said bed, and means operating automatically upon such cooperation adapted to effect cooperation of said supplemental platen and said selected part of said bed.

18. A machine of the character described, comprising, a printing bed, main and supplemental platens, means for locating said main platen to a selected position along said bed, and means operating automatically upon such location adapted to locate said supplemental platen at that position.

19. A machine of the character described, comprising, a printing bed, main and supplemental platens, means for locating said main platen to a selected position along said bed, means operating automatically upon such location adapted to locate said supplemental platen at that position, and means for effecting cooperation of said located platens with said bed.

20. A machine of the character described, comprising, a printing bed, main and supplemental platens, means for locating said main platen to a selected position along said bed, means operating automatically upon such location adapted to locate said supplemental platen at that position, and means for effecting cooperation with said bed of each platen when located.

21. A machine of the character described, comprising, a printing bed, main and supplemental platens, means for locating said main platen to a selected position along said bed, means for effecting cooperation of said located platen and said bed, means operating automatically upon such location and cooperation adapted to locate said supplemental platen at that position, and means for effecting cooperation of said located supplemental platen and said bed.

22. A machine of the character described, comprising, a guide, a main carriage thereon, a supplemental carriage on said main carriage, means for locating said main carriage on said guide, and means for locating said supplemental carriage on said main carriage.

23. A machine of the character described, comprising, a guide, a main carriage thereon, a supplemental carriage on said main carriage, means for selectively locating said main carriage on said guide, and means for locating said supplemental carriage on said main carriage.

24. A machine of the character described, comprising, a guide, a main carriage thereon, a supplemental carriage on said main carriage, means for selectively locating said main carriage on said guide, and means for selectively locating said supplemental carriage on said main carriage.

25. A machine of the character described, comprising, a guide, a main carriage thereon, a supplemental carriage on said main carriage, means for locating said main carriage in selected positions along said guide, and means for locating said supplemental carriage.

26. A machine of the character described, comprising, a guide, a main carriage thereon, a supplemental carriage on said main carriage, means for locating said main carriage in selected positions along said guide, and means for locating said supplemental carriage in selected positions along said main carriage.

27. A machine of the character described, comprising, a guide, a main carriage thereon, a supplemental carriage on said main carriage, means for locating said main carriage on said guide, means for locating said supplemental carriage on said main carriage, and selective manipulative means for effecting such locations.

28. A machine of the character described, comprising, a guide, a main carriage thereon, a supplemental carriage on said main carriage, means for locating said main carriage on said guide, means for locating said supplemental carriage on said main carriage, and selective manipulative means for effecting location of said main carriage.

29. A machine of the character described, comprising, a guide, a main carriage thereon, a supplemental carriage on said main carriage, means for locating said main carriage on said guide, and means effected upon such location for locating said supplemental carriage on said main carriage.

30. A machine of the character described, comprising, a guide, a main carriage thereon, a supplemental carriage on said main carriage, means for locating said main carriage, and means for successively locating said supplemental carriage.

31. A machine of the character described, comprising, a guide, a main carriage thereon, a supplemental carriage on said main carriage, means for locating said main carriage, and means for automatically locating said supplemental carriage.

32. A machine of the character described, comprising, a guide, a main carriage thereon, a supplemental carriage on said main carriage, means for locating said main carriage, and means for automatically locating said supplemental carriage in successive steps.

33. A machine of the character described, comprising, a guide, a main carriage thereon, a supplemental carriage on said main carriage, means for locating said main carriage, and means effected upon such location adapted to automatically locate said supplemental carriage.

34. A machine of the character described, comprising, a guide, a main carriage thereon, a supplemental carriage on said main carriage, means for locating said main carriage, and means effected upon such location adapted to automatically locate said supplemental carriage in successive steps.

35. A machine of the character described, comprising, a guide, a main carriage thereon, a supplemental carriage on said main carriage, main and supplemental platens on said supplemental carriage, means for locating said main carriage, and means for locating said supplemental carriage.

36. A machine of the character described, comprising, a guide, a main carriage thereon, a supplemental carriage on said main carriage, main and supplemental platens on said supplemental carriage, means for locating said main carriage and the main platen, and means for locating said supplemental carriage and the supplemental platen.

37. A machine of the character described, comprising, a guide, a main carriage thereon, a supplemental carriage on said main carriage, main and supplemental platens on said supplemental carriage, means for locating said main carriage, and means for locating the supplemental carriage adapted to successively locate the platens.

38. A machine of the character described, comprising, a guide, a main carriage thereon, a supplemental carriage on said main carriage, main and supplemental platens on said supplemental carriage, means for locating said main carriage, means for locating the supplemental carriage adapted to locate the main platen, and means for locating the supplemental carriage adapted to locate the supplemental platen.

39. A machine of the character described, comprising, a guide, a main carriage thereon, a supplemental carriage on said main carriage, main and supplemental platens on said supplemental carriage, means for locating said main carriage, and means for locating said supplemental carriage in successive steps adapted to successively locate said main and said supplemental platens.

40. A machine of the character described, comprising, a guide, a main carriage thereon, a supplemental carriage on said main carriage, main and supplemental platens on said supplemental carriage, means for locating said main carriage at a selected position on said guide, and means for locating said supplemental carriage at said positions.

41. A machine of the character described, comprising, a guide, a main carriage thereon, a supplemental carriage on said main carriage, main and supplemental platens on said supplemental carriage, means for locating said main carriage at selected positions on said guide, and means for locating said supplemental carriage in successive steps at said positions.

42. A machine of the character described, comprising, a guide, a main carriage thereon, a supplemental carriage on said main carriage, main and supplemental platens on said supplemental carriage, means for locating said main carriage at selected positions on said guide, and means for locating said supplemental carriage in successive steps adapted to successively locate said main and supplemental platens at said positions.

43. A machine of the character described, comprising, a guide, a carriage thereon, a platen on said carriage, a striker on said carriage and adapted for cooperation with said platen, and means for locating said carriage.

44. A machine of the character described, comprising, a guide, a carriage thereon, a platen on said carriage, a striker on said carriage and adapted for cooperation with said platen, and means for locating said carriage in selected positions along said guide.

45. A machine of the character described, comprising, a guide, a carriage thereon, a platen on said carriage, a striker on said carriage and adapted for cooperation with said platen, means for locating said carriage, and selective manipulative means adapted to effect such location.

46. A machine of the character described, comprising, a guide, a carriage thereon, a platen on said carriage, a striker on said carriage and adapted for cooperation with said platen, means for locating said carriage, and means effected upon such location adapted to cause such cooperation.

47. A machine of the character described, comprising, a guide, a main carriage thereon, a supplemental carriage on said main carriage, a platen on said supplemental carriage, a cooperating striker on said main carriage, and means for locating said carriages.

48. A machine of the character described, comprising, a guide, a main carriage thereon, a supplemental carriage on said main carriage, a platen on said supplemental carriage, a cooperating striker on said main carriage, means for locating said main carriage, and means for locating said supplemental carriage.

49. A machine of the character described, comprising, a guide, a main carriage thereon, a supplemental carriage on said main carriage, a platen on said supplemental carriage, a cooperating striker on said main carriage, means for locating said main carriage, means for locating said supplemental carriage, and means effected upon location of said supplemental carriage adapted to cause cooperation of said striker with said platen.

50. A machine of the character described, comprising, a guide, a carriage thereon, main and supplemental platens on said carriage, a striker on said carriage and adapted for cooperation with said platens, and means for locating said carriage.

51. A machine of the character described, comprising, a guide, a carriage thereon, main and supplemental platens on said carriage, a striker on said carriage and adapted for cooperation with said platens, means for locating said carriage, and means effected upon such location adapted to effect such cooperation.

52. A machine of the character described, comprising, a guide, a carriage thereon, main and supplemental platens on said carriage, a striker on said carriage and adapted for cooperation with said platens, means for locating said carriage, and means effected upon such location adapted to effect cooperation of said striker successively with said platens.

53. A machine of the character described, comprising, a guide, a carriage thereon, main and supplemental platens on said carriage, a striker on said carriage and adapted for cooperation successively with said platens, and means for locating said carriage.

54. A machine of the character described, comprising, a guide, a main carriage thereon, a supplemental carriage on said main carriage, main and supplemental platens on said supplemental carriage, a striker on said main carriage and adapted for cooperation with said platens, and means for locating said carriages.

55. A machine of the character described, comprising, a guide, a main carriage thereon, a supplemental carriage on said main carriage, main and supplemental platens on said supplemental carriage, a striker on said main carriage and adapted for cooperation with said platens, means for locating said main carriage, and means for locating said supplemental carriage adapted to effect such cooperation.

56. A machine of the character described, comprising, a guide, a main carriage thereon, a supplemental carriage on said main carriage, main and supplemental platens on said supplemental carriage, a striker on said main carriage and adapted for cooperation with said platens, means for locating said main carriage, and means for locating said supplemental carriage adapted to effect cooperation of said striker successively with said platens.

57. A machine of the character described, comprising, a guide, a carriage movable therealong, a supplemental carriage movable on said main carriage, means for locating said carriages, and means for retarding said supplemental carriage.

58. A machine of the character described, comprising, a carriage, means for setting up primary and secondary locations, and means for moving said carriage only upon setting up of the final location.

59. A machine of the character described, comprising, a carriage, means for setting up primary, secondary and tertiary locations, and means for moving said carriage only upon setting up of the final location.

60. A machine of the character described, comprising, a carriage retained in normal position, means for setting up primary and secondary locations, and means for releasing said carriage only upon setting up of the final location.

61. A machine of the character described, comprising, a carriage retained in normal position, means for setting up primary, secondary and tertiary locations, and means for releasing said carriage upon setting up of the final location.

62. A machine of the character described, comprising, a carriage, means for setting up primary and secondary locations, and means for automatically locating said carriage in successive steps at the final location.

63. A machine of the character described, comprising, a carriage, means for setting up primary, secondary and tertiary locations, and means for automatically locating said carriage in successive steps at the final location.

64. A machine of the character described, comprising, a carriage, means for setting up primary and secondary locations, means for moving said carriage only upon setting up of the final location, and means for automatically locating said carriage at the final location.

65. A machine of the character described, comprising, a carriage, means for setting up primary, secondary and tertiary locations, means for moving said carriage only upon setting up of the final location, and means for automatically locating said carriage at the final location.

66. A machine of the character described, comprising, a carriage, means for setting up primary and secondary locations, means for moving said carriage upon setting up of the final location, and means for automatically locating said carriage in successive steps at the final location.

67. A machine of the character described, comprising, a carriage, means for setting up primary, secondary and tertiary locations, means for moving said carriage upon setting up of the final location, and means for automatically locating said carriage in successive steps at the final location.

68. A machine of the character described, comprising, a carriage, means for setting up primary, and secondary locations, means for moving said carriage only upon setting up of the final location, and selective manipulative means for effecting such settings.

69. A machine of the character described, comprising, a carriage, means for setting up primary, secondary and tertiary locations, means for moving said carriage only upon setting up of the final location, and selective manipulative means for effecting such settings.

70. A machine of the character described, comprising, a carriage, means for setting up primary and secondary locations, means for moving said carriage only upon setting up of the final location, means for automatically locating said carriage at the final location, and selective manipulative means for effecting such settings.

71. A machine of the character described, comprising, a carriage, means for setting up primary, secondary and tertiary locations, means for moving said carriage upon setting up of the final location, means for automatically locating said carriage in successive steps at the final location, and selective manipulative means for effecting such settings.

72. Mechanism of the character described, comprising, a locating-member, a series of stops for said members, and selective manipulative means for controlling said stops.

73. Mechanism of the character described, comprising, a locating member, a series of stops for said member, and selective manipulative elements for said respective stops.

74. Mechanism of the character described, comprising, a normally retained locating member, a series of stops for said member, and selective manipulative means for controlling said stops and for releasing said member.

75. Mechanism of the character described, comprising, a pair of relatively movable locating members, a series of stops for one of said members, and selective manipulative means for controlling said stops.

76. Mechanism of the character described, comprising, a locating member, a series of primary stops for said member, a series of secondary stops for said member, and selective manipulative means for controlling said stops.

77. Mechanism of the character described, comprising, a locating member, primary and secondary stops for said member, and selective manipulative means for controlling said stops.

78. Mechanism of the character described, comprising, a locating member, primary, secondary and tertiary stops for said member, and selective manipulative means for controlling said stops.

79. Mechanism of the character described, comprising, a locating member, primary and secondary stops for said member, and selective manipulative means adapted for cooperation successively with said primary and said secondary stops.

80. Mechanism of the character described, comprising, a locating member, primary, secondary and tertiary stops for said member, and selective manipulative means adapted for cooperation successively with said primary, secondary and tertiary stops.

81. Mechanism of the character described, comprising, a locating member, a primary element for positioning said member, and a secondary element for positioning said member with respect to said primary element.

82. Mechanism of the character described, comprising, a locating member, a primary element for positioning said member, a secondary element for positioning said member with respect to said primary element, and a tertiary element for positioning said member with respect to said secondary element.

83. Mechanism of the character described, comprising, a locating member, a primary element for positioning said member, and a secondary element for diminishingly positioning said member with respect to said primary element.

84. Mechanism of the character described, comprising, a locating member, a primary element for positioning said member, a secondary element for diminishingly positioning said member with respect to said primary element, and a tertiary element for diminishingly positioning said member with respect to said secondary element.

85. Mechanism of the character described, comprising, a locating member, a primary element for positioning said member, a secondary element for positioning said member with respect to said primary element, and selective manipulative means for controlling said elements.

86. Mechanism of the character described, comprising, a locating member, a primary element for positioning said member, a secondary element for positioning said member with respect to said primary element, a tertiary element for positioning said member with respect to said secondary element, and selective manipulative means for controlling said elements.

87. Mechanism of the character described, comprising, a locating member, a primary element for positioning said member, a secondary element for positioning said member with respect to said primary element, and selective manipulative means for controlling successively said primary and said secondary elements.

88. Mechanism of the character described, comprising, a locating member, a primary element for positioning said member, a secondary element for positioning said member with respect to said primary element, a tertiary element for positioning said member with respect to said secondary element, and selective manipulative means for controlling successively said primary, secondary and tertiary elements.

89. Mechanism of the character described, comprising, a locating member, a series of movable stops therefor, and a retainer for said member adapted for operation by any of said stops.

90. Mechanism of the character described, comprising, a locating member, a series of movable stops therefor, and means operable by any of said stops adapted to release said member.

91. Mechanism of the character described, comprising, a locating member having a series of locating elements, a movable member adapted to render said elements effective, and a releasing member cooperating with said members.

92. Mechanism of the character described, comprising, a locating member having a series of locating elements, a movable member adapted to render said elements effective, and a releasing member arranged intermediate said members.

93. Mechanism of the character described, comprising, a locating member, having a series of elements arranged therealong, a movable member arranged along said locating member and having a series of corresponding locating elements, and a releasing member cooperating with said members.

94. Mechanism of the character described, comprising, a locating member, having a series of elements arranged therealong, a movable member arranged along said locating member and having a series of corresponding locating elements, and a releasing member arranged intermediate said members.

In testimony whereof we affix our signatures this 16th day of March, 1920.

LUTHER A. WATTERS.
EDWIN L. RELLER.